Figure 1:
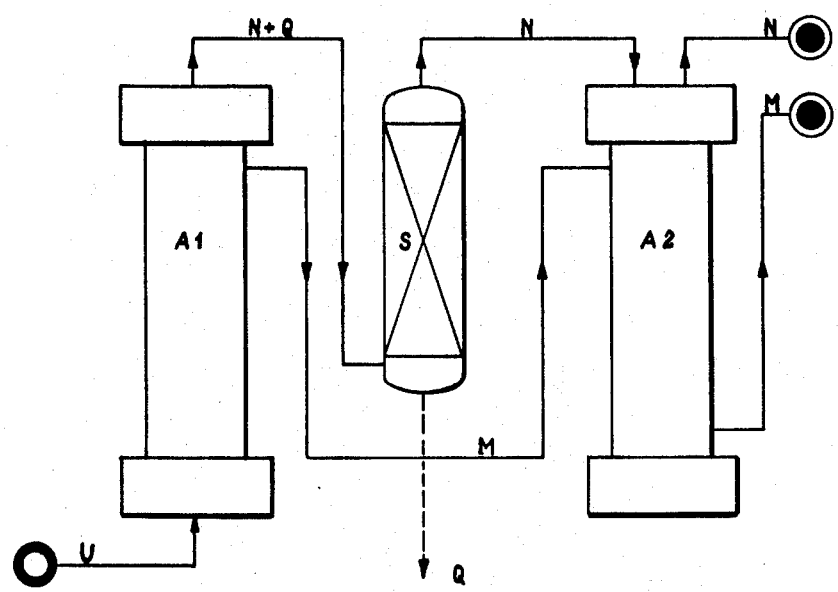

United States Patent Office 3,116,294
Patented Dec. 31, 1963

3,116,294
PROCESS FOR PREPARING HIGH-PURITY MELAMINE FROM UREA
Gerlando Marullo, Giuseppe Rinaudo, Ibrahim Dakli, Mario Donati, Eraldo Fornasieri, and Tiziano Garlanda, all of Milan, Italy, assignors to Montecatini Società Generale per l'Industria Mineraria e Chimica, Milan, Italy
Filed Oct. 18, 1960, Ser. No. 63,284
Claims priority, application Italy Oct. 22, 1959
4 Claims. (Cl. 260—249.7)

This invention relates to improvements in processes for preparing melamine from urea. It particularly relates to a process the melamine product of which has very high purity, namely a melamine content higher than 99%.

According to known processes, by heating urea under suitable temperature and pressure conditions, with or without addition of ammonia, melamine is obtained in good yields, but with a purity in general not higher than 94 to 96%.

The purification of the product to obtain pure melamine, suitable for the preparation of resins, for example, is expensive. Such purification requires special and complicated treatment.

The principal object of this invention is to obtain highly pure melamine from urea, without need for recourse to purification treatments which increase the cost of the product.

The conversion of urea to melamine takes place according to the following simplified reaction scheme:

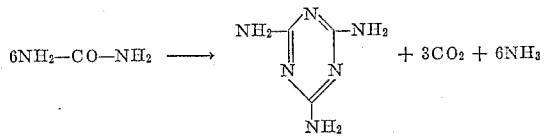

Together with the formation of melamine, there also takes place the formation of $NH_3$, $CO_2$, and other not well defined intermediate or secondary gaseous products, which may be considered as comprised under the item $CO_2$.

Several patents and papers discuss the favorable influence of the presence of $NH_3$ in the reaction stage, and observe that $NH_3$ prevents the decomposition of melamine, under the reaction conditions. For this reason, in many known processes $NH_3$ is added together with the urea introduced into the reactor.

However, it is noteworthy that the same patents and technical papers, relating to the preparation of melamine from urea, give no indication or suggestion concerning any influence that $CO_2$ may have on the course of the reaction, and therefore, on the composition of the end product. In contradistinction, and contrast, we have found, to our surprise, that $CO_2$ is the main cause of the presence of impurities in the melamine. Furthermore, if said impurities are treated with ammonia under suitable temperature and pressure conditions, as specified hereinbelow, they can be transformed into melamine.

The production of melamine from urea, according to the present invention, is carried out in two stages. In the first stage, urea is transformed into melamine and intermediate and side products. Among the latter products, $CO_2$ and $NH_3$ are present in the form of gases. In the second stage the reaction is completed in the presence of $NH_3$ alone, after separation of $CO_2$.

In this way high-purity melamine is obtained, so that a successive treatment of the raw product can be dispensed with.

The removal of $CO_2$ from the reaction mixture can be carried out by any of the well known physical or chemical methods, e.g., by bubbling the gaseous mixture obtained in the first reaction stage through an alkaline or a similar solution, activated or not, which is selective in respect of $CO_2$, or through quicklime.

According to a preferred embodiment, it has been found advantageous to separate, immediately after the first reaction stage, the gas consisting of $CO_2$ and $NH_3$ from the raw product, and to treat the latter with $NH_3$ alone.

The noxious influence of $CO_2$ on the purity of the product, and the favorable action of the treatment with $NH_3$ in the absence of $CO_2$ are evidenced by a series of tests carried out by us, which are summarized as follows:

Upon heating the raw melamine obtained from urea by conventional processes, and having a purity of 95%, at 380° C. for 3 hours, in the presence of $NH_3$ alone in absence of water, and under a pressure of 60 atm., a product having a melamine content higher than 99% is obtained, in quantitative yield.

On the other hand, the same raw melamine, having a purity of 95%, when treated with a mixture consisting of 1 part $CO_2$ and 2 parts $NH_3$, under the above temperature and pressure conditions, and more specifically with a partial ammonia pressure of 60 atm., did not increase in purity, and retains the impurity characteristics of melamine as commonly produced by conversion of urea.

To further confirm the possibility of obtaining melamine free of impurities, by operating in absence of $CO_2$, we separated, in the pure state, the impurities generally present (in proportion of 5%) in the melamine obtained from urea. We then treated said impurities in the presence of $NH_3$, alone under the conditions already specified. Most of these impurities were converted into melamine.

These surprising results prove the noxious influence of $CO_2$ on the purity of melamine obtained from urea, and provide the basis for the herein-described commercial process for the production of melamine from urea, by which it is possible to obtain melamine of very high purity at the point of discharge from the reactor, without requiring any purification. Moreover, the yield of melamine in respect to urea is of 5 or 6 units higher than the yields obtained by the known processes. The real increase in the yield of melamine is still higher, if one considers the loss of melamine occurring in the known processes, during the purification of the raw product, in order to obtain 99% melamine.

Figure 2:
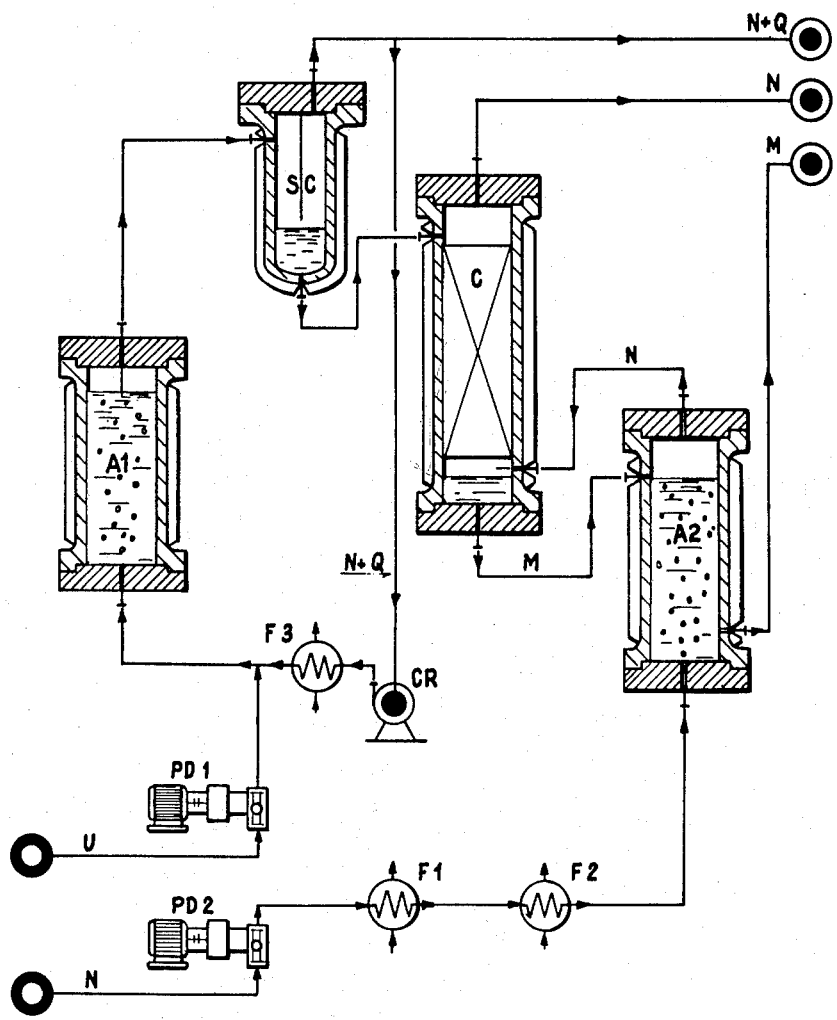
Figure 3:
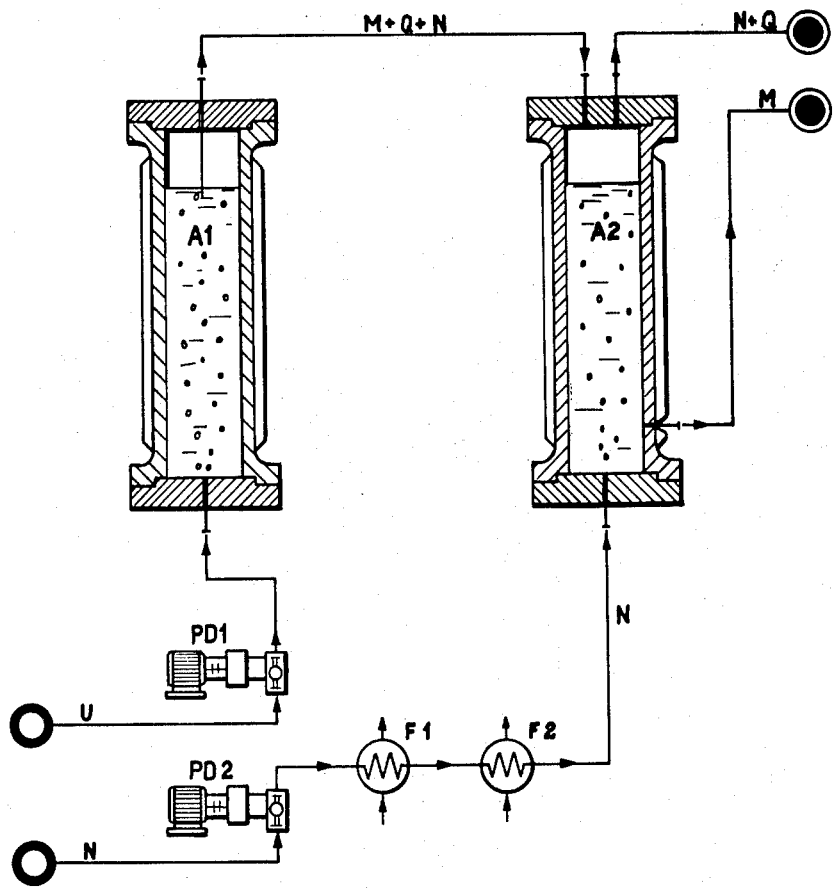

The principles of the invention will be illustrated with reference to the accompanying drawings, in which FIG. 1 is a schematic representation of a process carried out according to the invention, and FIGS. 2 and 3 illustrate, in greater detail, two preferred embodiments of continuous processes, also according to the invention.

In FIG. 1, $A_1$ is a first reactor into which urea is introduced from U and in which the transformation of urea into melamine, $NH_3$ and $CO_2$, and other intermediate and side products, takes place. S is a separator for separating $CO_2$ from the gases produced in $A_1$. At $A_2$ is a second reactor in which the transformation reaction is completed in the presence of $NH_3$ alone.

The liquid product formed in $A_1$ is passed, e.g., by gravity, through line M into reactor $A_2$. At the same time, the ammonia recovered in S from the gaseous mixture formed in $A_1$, or fresh ammonia coming from outside, is passed through line N into reactor $A_2$. The $CO_2$ separated in S is removed through the breather pipe or line Q.

The operating conditions of the two reaction stages are preferably the same, but can vary within wide limits. Pressure can vary from 10 atm. to the economic limits, preferably from 40 to 150 atm., while the temperature can be varied from 250° to 500° C., preferably from 340 to 400° C., in order to keep the melamine in the molten state and also to avoid, with higher temperatures, excessive pressures. It is convenient to increase the optimum reaction pressure in the reactor if temperature is increased. The process can be carried out continuously or batchwise.

In FIG. 2, molten urea coming from source U at about 150° C. is pumped continuously by dosing pump $PD_1$ into the first reactor $A_1$, under suitable pressure and temperature conditions, as described above, to obtain transformation into melamine, and into intermediate and side products. At the outlet of reactor $A_1$, the product is passed into a separating cyclone SC in which the gaseous phase, consisting of $CO_2$ and $NH_3$ formed during the reaction, is separated from the liquid phase by simple physical separation. The latter is then passed into a column C where it is treated in countercurrent with $NH_3$ coming from $A_2$ through line N, to eliminate the still dissolved $CO_2$. The product is then collected in the second reactor $A_2$ where it remains for a certain time, always in the presence of $NH_3$, introduced at the bottom of the reactor, to complete the reaction.

The high purity melamine, collected in $A_2$, is then discharged to M, and cooled according to known methods, which however do not cause any degradation while operating, e.g., by quenching with water or by mixing with cold gases.

In FIG. 2, $PD_2$ represents the feeding pump for anhydrous ammonia, $F_1$ is the evaporator, $F_2$ the superheater for said ammonia, N is the ammonia line, M the melamine line, and $N+Q$ is the line of the mixture $NH_3+CO_2$.

The gaseous mixture, consisting of $CO_2$ and $NH_3$, that is formed in the reaction and is separated from melamine in separator SC, can be treated separately to recover the sublimed melamine present therein. It can then be used again, without any necessary additions, for the production of urea, since it contains the $CO_2$ and $NH_3$ components in the stoichiometric ratio suitable thereof. Alternatively, all or part of said mixture can also be fractioned into its two components according to known processes, e.g., by treatment with diethanolamine or with other selective solvents, and the two components can then be utilized independently.

Also, as shown in the drawing, the said $CO_2$—$NH_3$ mixture can be recycled continuously into reactor $A_1$ by compressor CR, to favor homogenization of the reacting product. Under the conditions described, the use of agitators or other rotating means inside reactor $A_1$ is not necessary and has no advantages. The construction of the reactor is therefore simplified. The $NH_3$—$CO_2$ mixture to be recycled can also be heated in heat exchanger $F_3$ to a temperature 100° to 200° C. above the reaction temperature, to supply a portion of the heat required for the reaction.

The $NH_3$ freed at the top of the stripping column C can be added to the gaseous $NH_3$—$CO_2$ mixture coming from separator SC or it can be treated to remove the low $CO_2$ content thereof (e.g., by treatment with lime) and then recycled to $A_2$. The actual $NH_3$ consumption for the treatment of the raw product is thus practically nil.

In FIG. 3 is illustrated a further embodiment of the process carried out according to the invention. Urea is continuously pumped at $PD_1$ into reactor $A_1$ where it undergoes partial transformation. The entire reaction product is then passed through line $M+Q+N$ into the second reactor $A_2$. The gaseous phase, consisting of $CO_2$ and $NH_3$, is immediately separated at the top of reactor $A_2$, being removed through line $N+Q$. The liquid phase descends through the reactor $A_1$ and is contacted, in countercurrent, with ammonia coming from $A_2$ to remove the $CO_2$, if any, still dissolved therein. Anhydrous ammonia is pumped into the bottom of reactor $A_2$, as in FIG. 2.

The high-purity melamine thus formed in $A_2$ is discharged from $A_2$ through line M. This second embodiment is obviously simpler than the preceding one, described in FIG. 2, but requires higher $NH_3$ consumption to separate the $CO_2$ still dissolved in the melamine. This $NH_3$ is, moreover, recovered only as a $NH_3+CO_2$ mixture.

The following examples illustrate specific embodiments of the present invention, but are not intended to limit its scope.

*Example 1*

120 kilograms per hour of urea heated to 150° C. are fed to a 65-liters reactor resistant to corrosion by the reaction products. The pressure in the reactor is 60 atm. and the reaction temperature is 380° C., obtained by heaters employing condensing mercury.

The product leaving the reactor is passed into a separating cyclone, where the $NH_3$ and $CO_2$ developed during the reaction are separated from molten melamine. The melamine is passed into a stripping column where $NH_3$ is fed in countercurrent, in the proportions of 0.5 kg. $NH_3$ per kg. of melamine. The melamine is collected in a second vessel, where it remains for about 3 hours, in the presence of $NH_3$. The stripping column and said second vessel are kept at the same temperature and pressure as the reactor. The product is cooled and discharged. Crystalline melamine having a purity of 99.3%, is obtained in practically theoretical yield (98.5%).

*Example 2*

120 kilograms per hour of urea heated to 150° C. are fed to a corrosion-proof 65-liter reactor. The pressure in the reactor is 90 atm. and the reaction temperature, obtained by mercury heating, is 380° C.

The product leaving the reactor is passed into a separating cyclone, where $NH_3$ and $CO_2$ developed during the reaction are separated from molten melamine. The melamine is passed to a stripping column to which $NH_3$ is fed in countercurrent, in the proportions of 0.3 kg. $NH_3$/kg. melamine. Melamine is collected in a second vessel where it is kept for about 3 hours in the presence of $NH_3$. The product is then cooled and discharged. The stripping column and the following vessel, i.e. the second vessel, were kept at the same temperature and pressure as the reactor. 99.5% solid melamine is obtained, in theoretical yield.

We claim:

1. A process for making melamine, comprising converting urea into a melamine liquid product, and a gaseous mixture of carbon dioxide and ammonia, removing the gaseous mixture, treating said liquid melamine product in a stripping zone in countercurrent with ammonia, to remove any carbon dioxide dissolved therein, and then maintaining said liquid melamine product in contact with ammonia under conditions suitable for conversion of urea to melamine, to complete the conversion into melamine, anhydrous ammonia being bubbled through said liquid melamine product to maintain said contact, the ammonia being passed therefrom into said stripping zone, the temperatures and pressures in both said conversions being at from about 10 to 150 atmospheres and at about 250° to 500° C.

2. The process of claim 1, the said temperature being from 340° to 400° C.

3. A process for making melamine, comprising converting urea into a melamine liquid product, and a gaseous mixture of carbon dioxide and ammonia, blowing out the gases, treating said melamine product in a stripping zone in countercurrent with ammonia, to remove any carbon dioxide dissolved therein, and then maintaining said liquid melamine product in contact with ammonia under conditions suitable for conversion of urea to melamine, to complete the conversion into melamine, the temperature and pressures in both conversions being at from about 10 to 150 atmospheres and at about 250° to 500° C.

4. A process for making highly pure melamine, which comprises converting urea into liquid melamine, and a gaseous mixture of carbon dioxide and ammonia, removing carbon dioxide gas therefrom, and completing melamine formation by subjecting the melamine, in molten state, and substantially free of carbon dioxide, to treatment with ammonia, in the substantial absence of carbon dioxide and water, said treatment being at 250–500° C., at a pressure sufficient to keep the melamine in molten state.

References Cited in the file of this patent

UNITED STATES PATENTS

| | | |
|---|---|---|
| 2,566,231 | Paden | Aug. 28, 1951 |
| 2,769,005 | Walter | Oct. 30, 1956 |
| 2,815,269 | Saunders et al. | Dec. 3, 1957 |
| 2,918,467 | Hibbitts et al. | Dec. 22, 1959 |